(12) United States Patent
Xu et al.

(10) Patent No.: US 10,893,019 B2
(45) Date of Patent: Jan. 12, 2021

(54) ADDRESS MANAGEMENT METHOD AND APPARATUS

(71) Applicant: Huawei Technologies Co., Ltd., Shenzhen (CN)

(72) Inventors: Weiping Xu, Dongguan (CN); Hengjun Zhu, Dongguan (CN); Shucheng Liu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/296,682

(22) Filed: Mar. 8, 2019

(65) Prior Publication Data
US 2019/0238500 A1     Aug. 1, 2019

Related U.S. Application Data

(63) Continuation of application No. PCT/CN2017/101052, filed on Sep. 8, 2017.

(30) Foreign Application Priority Data

Sep. 9, 2016    (CN) .......................... 2016 1 0812340

(51) Int. Cl.
     *H04L 29/12*       (2006.01)

(52) U.S. Cl.
     CPC ...... *H04L 61/2007* (2013.01); *H04L 61/2061* (2013.01)

(58) Field of Classification Search
     CPC .................. H04L 61/2007; H04L 61/2061
     See application file for complete search history.

(56) References Cited

U.S. PATENT DOCUMENTS 6,988,148 B1 * 1/2006 Sheth ................ H04L 29/12283
                                               709/220
7,197,549 B1 * 3/2007 Salama ............. H04L 29/12283
                                               709/223
(Continued)

FOREIGN PATENT DOCUMENTS

CN          1380773 A     11/2002
CN          1567887 A      1/2005
(Continued)

OTHER PUBLICATIONS

T. Bates, et al., "Multiprotocol Extensions for BGP-4," Network Working Group, RFC 4760, Jan. 2007, 12 pages.
(Continued)

*Primary Examiner* — Philip J Chea
*Assistant Examiner* — Wuji Chen
(74) *Attorney, Agent, or Firm* — Slater Matsil, LLP

(57) ABSTRACT

The present invention discloses an address management method and apparatus, to help dynamically adjust an address resource and improve address resource utilization. The method includes: establishing a communication connection to a network device based on a specified routing protocol; receiving an address pool status message sent by the network device; determining, based on the address pool status message, whether an address pool of the network device is in an address insufficient state or an address abundant state; and sending a first routing message to the network device by using the communication connection if the address pool of the network device is in the address insufficient state; or sending a second routing message to the network device by using the communication connection if the address pool of the network device is in the address abundant state.

15 Claims, 9 Drawing Sheets

(56) References Cited

U.S. PATENT DOCUMENTS

| | | | | |
|---|---|---|---|---|
| 7,254,630 B1* | 8/2007 | Daude | ............... | H04L 29/12009 709/220 |
| 7,587,493 B1* | 9/2009 | Sheth | ................ | H04L 29/12283 709/226 |
| 7,788,345 B1* | 8/2010 | Sukiman | ............. | H04L 61/2061 709/220 |
| 8,321,567 B1* | 11/2012 | Sheth | .................... | H04L 41/046 709/226 |
| 2012/0173646 A1* | 7/2012 | Lan | .................... | H04L 61/2015 709/206 |
| 2012/0191825 A1* | 7/2012 | Dai | .................... | H04L 61/6068 709/220 |
| 2017/0195282 A1* | 7/2017 | Teng | .................. | H04L 61/2007 |

FOREIGN PATENT DOCUMENTS

| | | |
|---|---|---|
| CN | 1671114 A | 9/2005 |
| CN | 104486452 A | 4/2015 |
| CN | 104994182 A | 10/2015 |
| CN | 105306614 A | 2/2016 |
| CN | 106060182 A | 10/2016 |
| JP | 2011097468 A | 5/2011 |

OTHER PUBLICATIONS

Y. Rekhter, et al., "Carrying Label Information in BGP-4," Network Working Group, RFC 3107, May 2001, 8 pages.

\* cited by examiner

ADDRESS MANAGEMENT METHOD AND APPARATUS

CROSS-REFERENCE TO RELATED APPLICATIONS

This application is a continuation of International Application No. PCT/CN2017/101052, filed on Sep. 8, 2017, which claims priority to Chinese Patent Application No. 201610812340.3, filed on Sep. 9, 2016. The disclosures of the aforementioned applications are hereby incorporated by reference in their entireties.

TECHNICAL FIELD

The present invention relates to the field of communications technologies, and in particular, to an address management method and apparatus.

BACKGROUND

When a user uses a client to access a network, a network device may assign an Internet Protocol IP) address to the client. After obtaining the IP address, the client can access the network to perform communication. As a quantity of users continuously increases, to meet a network access requirement of the user, an address pool is usually configured in the network device. A plurality of IP address segments may be stored in the address pool. The plurality of IP address segments are used to meet a large quantity of IP address assignment requirements. The IP address segments in the address pool of the network device are usually manually managed. In this case, if a quantity of clients frequently changes, a technical person needs to adjust a quantity of IP address segments in the address pool for a plurality of times.

SUMMARY

To resolve a problem in related technologies, embodiments of the present invention provide an address management method and apparatus, to help dynamically adjust an address resource and improve address resource utilization. The technical solutions are as follows:

According to a first aspect, an address management method is provided, where the method is applied to a control device, and the method includes: establishing a communication connection to a network device based on a specified routing protocol; receiving an address pool status message sent by the network device; determining, based on the address pool status message, whether an address pool of the network device is in an address insufficient state or an address abundant state; and sending a first routing message to the network device by using the communication connection if the address pool of the network device is in the address insufficient state, where the first routing message carries a first IP address set, and the first IP address set is an IP address set assigned to the address pool; or sending a second routing message to the network device by using the communication connection if the address pool of the network device is in the address abundant state, where the second routing message carries a second IP address set, and the second IP address set is a to-be-recycled IP address set in the address pool.

In the embodiments of the present invention, the control device establishes the communication connection to the network device based on the specified routing protocol; when receiving the address pool status message sent by the network device, determines, based on the address pool status message, whether the address pool of the network device is in the address insufficient state or the address abundant state; and sends the first routing message to the network device by using the communication connection if the address pool of the network device is in the address insufficient state, to assign the first IP address set to the address pool of the network device; or sends the second routing message to the network device by using the communication connection if the address pool of the network device is in the address abundant state, to recycle the second IP address set in the address pool of the network device. In this way, the control device can automatically manage an IP address in the address pool of the network device, and a job burden on a technical person is reduced. In addition, the control device may assign the IP address to the address pool or recycle the IP address in the address pool based on an address pool status of the network device. Therefore, the IP address can be dynamically assigned and recycled as required, thereby improving address management accuracy.

The address pool status message is a first address status message, the first address status message includes utilization of each IP address segment in the address pool, the address insufficient state is a state in which the utilization of each IP address segment in the address pool is greater than or equal to first specified utilization, and the address abundant state is a state in which the address pool has an IP address segment whose utilization is less than or equal to second specified utilization.

The determining, based on the address pool status message, whether an address pool of the network device is in an address insufficient state or an address abundant state includes: obtaining the utilization that is of each IP address segment in the address pool and that is carried in the first address status message; and if the utilization of each IP address segment is greater than or equal to the first specified utilization, determining that the address pool is in the address insufficient state; or if the address pool has an IP address segment whose utilization is less than or equal to the second specified utilization, determining that the address pool is in the address abundant state.

In the embodiments of the present invention, the control device may determine, based on the utilization that is of each IP address segment in the address pool of the network device and that is carried in the first address status message sent by the network device, whether the address pool is in the address insufficient state or the address abundant state, and determining accuracy is relatively high.

Further, after the determining, if the address pool has an IP address segment whose utilization is less than or equal to the second specified utilization, that the address pool is in the address abundant state, the method further includes: determining an IP address segment whose utilization ratio is 0 in the address pool as an idle IP address set in the address pool; or when the first address status message carries a use status of each IP address in each IP address segment, obtaining, based on a use status of each IP address in the IP address segment whose utilization is less than or equal to the second specified utilization, an idle IP address from the IP address segment whose utilization is less than or equal to the second specified utilization, where the use status includes an idle state or an occupied state; and determining an idle IP address set in the address pool based on the obtained idle IP address.

In the embodiments of the present invention, when directly determining the IP address segment whose utilization ratio is 0 in the address pool of the network device as the idle IP address set in the address pool, the control device can quickly determine the idle IP address set in the address pool without a need of performing another complex operation, so that determining efficiency is relatively high. In addition, in this case, the first address status message may carry only the utilization of each IP address segment, so as to decrease data transmission between the network device and the control device, and reduce a transmission time of the first address status message.

When the control device obtains the idle IP address from the IP address segment whose utilization is less than or equal to the second specified utilization, and determines the idle IP address set in the address pool of the network device based on the obtained idle IP address, the control device can more accurately determine the idle IP address set in the address pool, so that management accuracy is higher and a management effect is better when the control device subsequently manages the IP address in the address pool based on the idle IP address set in the address pool.

The address pool status message is a second address status message, the second address status message includes utilization of the address pool, the address insufficient state is a state in which the utilization of the address pool is greater than or equal to first specified utilization, and the address abundant state is a state in which the utilization of the address pool is less than or equal to second specified utilization.

The determining, based on the address pool status message, whether an address pool of the network device is in an address insufficient state or an address abundant state includes: obtaining the utilization that is of the address pool and that is carried in the second address status message; and if the utilization of the address pool is greater than or equal to the first specified utilization, determining that the address pool is in the address insufficient state; or if the utilization of the address pool is less than or equal to the second specified utilization, determining that the address pool is in the address abundant state.

In the embodiments of the present invention, the control device may determine, based on the utilization that is of the address pool of the network device and that is carried in the second address status message sent by the network device, whether the address pool is in the address insufficient state or the address abundant state, and determining accuracy is relatively high.

Further, after the determining, if the utilization of the address pool is less than or equal to the second specified utilization, that the address pool is in the address abundant state, the method further includes: determining the IP address segment whose utilization ratio is 0 in the address pool as the idle IP address set in the address pool if the second address status message carries the utilization of each IP address segment in the address pool; or obtaining the idle IP address from the address pool based on the use status of each IP address in the address pool if the second address status message carries the use status of each IP address in the address pool; and determining the idle IP address set in the address pool based on the obtained idle IP address.

In the embodiments of the present invention, when directly determining the IP address segment whose utilization ratio is 0 in the address pool of the network device as the idle IP address set in the address pool, the control device can quickly determine the idle IP address set in the address pool without a need of performing another complex operation, so that determining efficiency is relatively high. In addition, in this case, the second address status message may carry only the utilization of the address pool and the utilization of each IP address segment in the address pool, so as to decrease data transmission between the network device and the control device, and reduce a transmission time of the second address status message.

When the control device obtains the idle IP address from the address pool, and determines the idle IP address set in the address pool of the network device based on the obtained idle IP address, the control device can more accurately determine the idle IP address set in the address pool, so that management accuracy is higher and a management effect is better when the control device subsequently manages the IP address in the address pool based on the idle IP address set in the address pool.

The determining, based on the address pool status message, whether an address pool of the network device is in an address insufficient state or an address abundant state includes: if the address pool status message is a first prompt message, determining that the address pool is in the address insufficient state, where the first prompt message includes information that is used to indicate that the address pool is in the address insufficient state; or if the address pool status message is a second prompt message, determining that the address pool is in the address abundant state, where the second prompt message includes information that is used to indicate that the address pool is in the address abundant state.

In the embodiments of the present invention, the control device can quickly determine, based on only the first prompt message or the second prompt message sent by the network device, whether the address pool of the network device is in the address insufficient state or the address abundant state, without a need of performing another complex operation. This determining process is simple and convenient, and determining efficiency is relatively high.

For example, the second prompt message carries the to-be-recycled IP address set in the address pool.

In the embodiments of the present invention, the control device can directly obtain the to-be-recycled IP address set in the address pool from the second prompt message when the second prompt message carries the to-be-recycled IP address set in the address pool of the network device, so that the control device subsequently can recycle the to-be-recycled IP address set in the address pool.

According to a second aspect, an address management method is provided, where the method is applied to a network device, and the method includes: establishing a communication connection to a control device based on a specified routing protocol; sending an address pool status message to the control device; receiving, by using the communication connection, a routing message sent by the control device, where the routing message carries an IP address set; and updating an address pool of the network device based on the IP address set carried in the routing message.

In the embodiments of the present invention, the network device establishes the communication connection to the control device based on the specified routing protocol. Then, the network device sends the address pool status message to the control device. When receiving, by using the communication connection, the routing message sent by the control device, the network device updates the address pool of the network device based on the IP address set carried in the routing message, so that the control device can automatically manage an IP address in the address pool of the network device, and a job burden on a technical person is reduced.

Further, the address pool status message is a first address status message, the first address status message includes utilization of each IP address segment in the address pool, the address insufficient state is a state in which the utilization of each IP address segment in the address pool is greater than or equal to first specified utilization, the address abundant state is a state in which the address pool has an IP address segment whose utilization is less than or equal to second specified utilization, and before the sending an address pool status message to the control device, the method further includes: obtaining the utilization of each IP address segment in the address pool; and generating the first address status message based on the utilization of each IP address segment; or the address pool status message is a second address status message, the second address status message includes utilization of the address pool, the address insufficient state is a state in which the utilization of the address pool is greater than or equal to first specified utilization, the address abundant state is a state in which the utilization of the address pool is less than or equal to second specified utilization, and before the sending an address pool status message to the control device, the method further includes: obtaining the utilization of the address pool; and generating the second address status message based on the utilization of the address pool.

In the embodiments of the present invention, the network device may send the first address status message or the second address status message to the control device, so that the control device determines, based on the first address status message or the second address status message, whether the address pool of the network device is in the address insufficient state or the address abundant state, and automatically manages the IP address in the address pool of the network device based on a determining result.

Further, the generating the first address status message based on the utilization of each IP address segment includes: determining a use status of each IP address in each IP address segment, where the use status includes an idle state or an occupied state; and generating the first address status message based on the utilization of each IP address segment and the use status of each IP address in each IP address segment, where the first address status message carries the utilization of each IP address segment and the use status of each IP address in each IP address segment.

In the embodiments of the present invention, the control device subsequently needs to recycle an idle IP address set in the address pool when the address pool of the network device is in the address abundant state. Therefore, when the first address status message carries the use status of each IP address in each IP address segment, the control device subsequently can accurately determine the idle IP address set in the address pool based on the use status of each IP address in each IP address segment.

Further, the generating the second address status message based on the utilization of the address pool includes: obtaining the utilization of each IP address segment in the address pool, and generating the second address status message based on the utilization of the address pool and the utilization of each IP address segment in the address pool, where the second address status message carries the utilization of the address pool and the utilization of each IP address segment in the address pool; or determining the use status of each IP address in the address pool, and generating the second address status message based on the utilization of the address pool and the use status of each IP address in the address pool, where the second address status message carries the utilization of the address pool and the use status of each IP address in the address pool.

In the embodiments of the present invention, the control device subsequently needs to recycle the idle IP address set in the address pool when the address pool of the network device is in the address abundant state. Therefore, when the second address status message carries the utilization of each IP address segment in the address pool or carries the use status of each IP address in the address pool, the control device subsequently can accurately determine the idle IP address set in the address pool based on the utilization of each IP address segment in the address pool or based on the use status of each IP address in the address pool.

Further, the address pool status message is a first prompt message or a second prompt message, the first prompt message includes information that is used to indicate that the address pool is in an address insufficient state, the second prompt message includes information that is used to indicate that the address pool is in an address abundant state, the address insufficient state is a state in which utilization of each IP address segment in the address pool is greater than or equal to first specified utilization, and the address abundant state is a state in which the address pool has an IP address segment whose utilization is less than or equal to second specified utilization; and before the sending an address pool status message to the control device, the method further includes: obtaining the utilization of each IP address segment in the address pool; and obtaining the first prompt message if the utilization of each IP address segment in the address pool is greater than or equal to the first specified utilization; or obtaining the second prompt message if the address pool has an IP address segment whose utilization is less than or equal to the second specified utilization.

Further, the address pool status message is a first prompt message or a second prompt message, the first prompt message includes information that is used to indicate that the address pool is in an address insufficient state, the second prompt message includes information that is used to indicate that the address pool is in an address abundant state, the address insufficient state is a state in which utilization of the address pool is greater than or equal to first specified utilization, and the address abundant state is a state in which the utilization of the address pool is less than or equal to second specified utilization; and before the sending an address pool status message to the control device, the method further includes: obtaining the utilization of the address pool; and obtaining the first prompt message if the utilization of the address pool is greater than or equal to the first specified utilization; or obtaining the second prompt message if the utilization of the address pool is less than or equal to the second specified utilization.

In the embodiments of the present invention, the network device can directly obtain the first prompt message or the second prompt message based on an address pool status. When receiving the first prompt message or the second prompt message, the control device subsequently can quickly determine whether the address pool of the network device is in the address insufficient state or the address abundant state, without a need of performing another complex operation, thereby simplifying a determining process of the control device and improving determining efficiency of the control device.

The obtaining the second prompt message includes: determining a to-be-recycled IP address set in the address pool; and generating the second prompt message based on the to-be-recycled IP address set in the address pool, where the second prompt message carries the to-be-recycled IP address set in the address pool.

In the embodiments of the present invention, the control device subsequently needs to recycle the to-be-recycled IP address set in the address pool when the address pool of the network device is in the address abundant state. Therefore, when the second prompt message carries the to-be-recycled IP address set in the address pool, the control device subsequently can recycle the to-be-recycled IP address set in the address pool after receiving the second prompt message.

The routing message is a first routing message, the IP address set is a first IP address set, the first IP address set is an IP address set assigned to the address pool, and the updating an address pool of the network device based on the IP address set carried in the routing message includes: adding the first IP address set to the address pool; or the routing message is a second routing message, the IP address set is a second IP address set, the second IP address set is a to-be-recycled IP address set in the address pool, and the updating an address pool of the network device based on the IP address set carried in the routing message includes: releasing the second IP address set in the address pool.

In the embodiments of the present invention, the network device does not need to perform another complex operation and can update the address pool only by adding the first IP address set to the address pool of the network device when receiving the first routing message sent by the control device or by releasing the second IP address set in the address pool of the network device when receiving the second routing message sent by the control device. This updating process is simple and convenient, and updating efficiency is relatively high.

According to a third aspect, an address management apparatus is provided, where the apparatus is disposed in a control device, and the apparatus includes: an establishment module, configured to establish a communication connection to a network device based on a specified routing protocol; a receiving module, configured to receive an address pool status message sent by the network device; a determining module, configured to determine, based on the address pool status message, whether an address pool of the network device is in an address insufficient state or an address abundant state; a first sending module, configured to send a first routing message to the network device by using the communication connection if the address pool of the network device is in the address insufficient state, where the first routing message carries a first Internet Protocol IP address set, and the first IP address set is an IP address set assigned to the address pool; and a second sending module, configured to send a second routing message to the network device by using the communication connection if the address pool of the network device is in the address abundant state, where the second routing message carries a second IP address set, and the second IP address set is a to-be-recycled IP address set in the address pool.

Optionally, the address pool status message is a first address status message, the first address status message includes utilization of each IP address segment in the address pool, the address insufficient state is a state in which the utilization of each IP address segment in the address pool is greater than or equal to first specified utilization, and the address abundant state is a state in which the address pool has an IP address segment whose utilization is less than or equal to second specified utilization; and the determining module is specifically configured to: obtain the utilization that is of each IP address segment in the address pool and that is carried in the first address status message; and if the utilization of each IP address segment is greater than or equal to the first specified utilization, determine that the address pool is in the address insufficient state; or if the address pool has an IP address segment whose utilization is less than or equal to the second specified utilization, determine that the address pool is in the address abundant state.

Optionally, the address pool status message is a second address status message, the second address status message includes utilization of the address pool, the address insufficient state is a state in which the utilization of the address pool is greater than or equal to first specified utilization, and the address abundant state is a state in which the utilization of the address pool is less than or equal to second specified utilization; and the determining module is specifically configured to: obtain the utilization that is of the address pool and that is carried in the second address status message; and if the utilization of the address pool is greater than or equal to the first specified utilization, determine that the address pool is in the address insufficient state; or if the utilization of the address pool is less than or equal to the second specified utilization, determine that the address pool is in the address abundant state.

Optionally, the determining module is specifically configured to: if the address pool status message is a first prompt message, determine that the address pool is in the address insufficient state, where the first prompt message includes information that is used to indicate that the address pool is in the address insufficient state; or if the address pool status message is a second prompt message, determine that the address pool is in the address abundant state, where the second prompt message includes information that is used to indicate that the address pool is in the address abundant state.

According to a fourth aspect, an address management apparatus is provided, where the apparatus is disposed in a network device, and the apparatus includes: an establishment module, configured to establish a communication connection to a control device based on a specified routing protocol; a sending module, configured to send an address pool status message to the control device; a receiving module, configured to receive, by using the communication connection, a routing message sent by the control device, where the routing message carries an Internet Protocol IP address set; and an updating module, configured to update an address pool of the network device based on the IP address set carried in the routing message.

Optionally, the address pool status message is a first address status message, the first address status message includes utilization of each IP address segment in the address pool, the address insufficient state is a state in which the utilization of each IP address segment in the address pool is greater than or equal to first specified utilization, the address abundant state is a state in which the address pool has an IP address segment whose utilization is less than or equal to second specified utilization, and the apparatus further includes: a first obtaining module, configured to obtain the utilization of each IP address segment in the address pool; and a first generation module, configured to generate the first address status message based on the utilization of each IP address segment; or the address pool status message is a second address status message, the second address status message includes utilization of the address pool, the address insufficient state is a state in which the utilization of the address pool is greater than or equal to first specified utilization, the address abundant state is a state in which the utilization of the address pool is less than or equal to second specified utilization, and the apparatus further includes: a second obtaining module, configured to obtain the utilization of the address pool; and a second generation module, configured to generate the second address status message based on the utilization of the address pool.

Optionally, the address pool status message is a first prompt message or a second prompt message, the first prompt message includes information that is used to indicate that the address pool is in an address insufficient state, the second prompt message includes information that is used to indicate that the address pool is in an address abundant state, the address insufficient state is a state in which utilization of each IP address segment in the address pool is greater than or equal to first specified utilization, and the address abundant state is a state in which the address pool has an IP address segment whose utilization is less than or equal to second specified utilization; and the apparatus further includes: a third obtaining module, configured to obtain the utilization of each IP address segment in the address pool; a fourth obtaining module, configured to obtain the first prompt message if the utilization of each IP address segment in the address pool is greater than or equal to the first specified utilization; and a fifth obtaining module, configured to obtain the second prompt message if the address pool has an IP address segment whose utilization is less than or equal to the second specified utilization.

Optionally, the address pool status message is a first prompt message or a second prompt message, the first prompt message includes information that is used to indicate that the address pool is in an address insufficient state, the second prompt message includes information that is used to indicate that the address pool is in an address abundant state, the address insufficient state is a state in which utilization of the address pool is greater than or equal to first specified utilization, and the address abundant state is a state in which the utilization of the address pool is less than or equal to second specified utilization; and the apparatus further includes: a sixth obtaining module, configured to obtain the utilization of the address pool; a seventh obtaining module, configured to obtain the first prompt message if the utilization of the address pool is greater than or equal to the first specified utilization; and an eighth obtaining module, configured to obtain the second prompt message if the utilization of the address pool is less than or equal to the second specified utilization.

Optionally, the routing message is a first routing message, the IP address set is a first IP address set, the first IP address set is an IP address set assigned to the address pool, and the updating module is specifically configured to add the first IP address set to the address pool; or the routing message is a second routing message, the IP address set is a second IP address set, the second IP address set is a to-be-recycled IP address set in the address pool, and the updating module is specifically configured to release the second IP address set in the address pool.

According to a fifth aspect, an address management apparatus is provided, where the address management apparatus is disposed in a control device. A structure of the address management apparatus includes a processor and a memory. The memory is configured to: store a program that supports the address management apparatus in executing the address management method provided in the first aspect, and store data used to implement the address management method provided in the first aspect. The processor is configured to execute the program stored in the memory. The address management apparatus may further include a communications bus, and the communications bus is configured to establish a connection between the processor and the memory.

According to a sixth aspect, an address management apparatus is provided, where the address management apparatus is disposed in a network device. A structure of the address management apparatus includes a processor and a memory. The memory is configured to: store a program that supports the address management apparatus in executing the address management method provided in the second aspect, and store data used to implement the address management method provided in the second aspect. The processor is configured to execute the program stored in the memory. The address management apparatus may further include a communications bus, and the communications bus is configured to establish a connection between the processor and the memory.

According to a seventh aspect, an embodiment of the present invention provides a computer storage medium, configured to store a computer software instruction used by the address management apparatus provided in the third aspect and the fifth aspect, or store a program designed for executing the address management apparatus in the third aspect and the fifth aspect.

According to an eighth aspect, an embodiment of the present invention provides a computer storage medium, configured to store a computer software instruction used by the address management apparatus provided in the fourth aspect and the sixth aspect, or store a program designed for executing the address management apparatus in the fourth aspect and the sixth aspect.

Beneficial effects brought by the technical solutions provided in the embodiments of the present invention are as follows: In the embodiments of the present invention, the control device establishes the communication connection to the network device based on the specified routing protocol; when receiving the address pool status message sent by the network device, determines, based on the address pool status message, whether the address pool of the network device is in the address insufficient state or the address abundant state; and sends the first routing message to the network device by using the communication connection if the address pool of the network device is in the address insufficient state, to assign the first IP address set to the address pool of the network device; or sends the second routing message to the network device by using the communication connection if the address pool of the network device is in the address abundant state, to recycle the second IP address set in the address pool of the network device. In this way, the control device can automatically manage the IP address in the address pool of the network device, and a job burden on a technical person is reduced. In addition, the control device may assign the IP address to the address pool or recycle the IP address in the address pool based on the address pool status of the network device. Therefore, the IP address can be dynamically assigned and recycled as required, thereby improving address management accuracy.

BRIEF DESCRIPTION OF THE DRAWINGS

FIG. 4B (b) is a schematic diagram of a format of a Border Gateway Protocol (BGP) notification (Notification) message according to an embodiment of the present invention;

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 1:
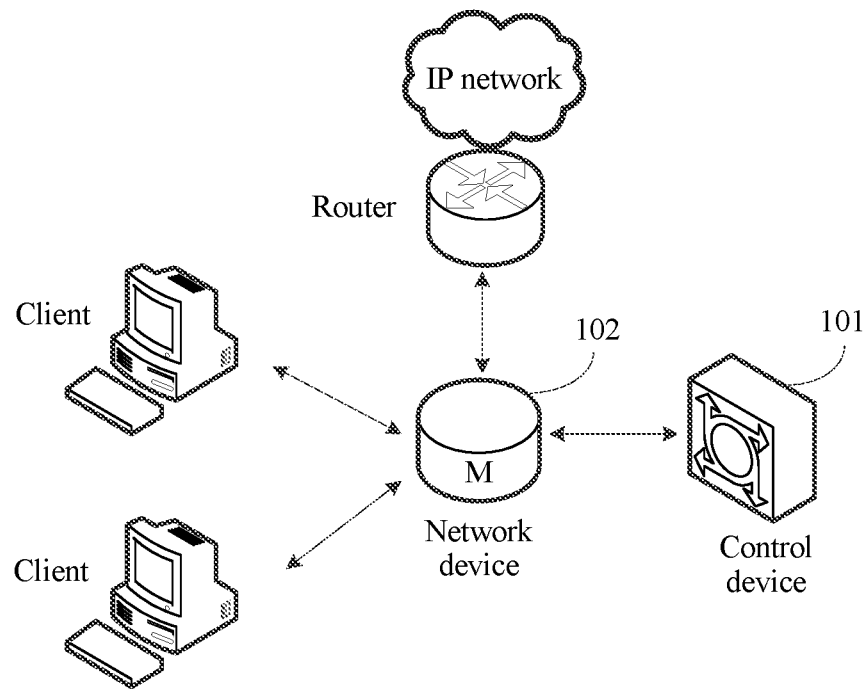
FIG. 1 is a schematic diagram of an implementation environment used in an address management method according to an embodiment of the present invention.

FIG. 1 is a schematic diagram of an implementation environment used in an address management method according to an embodiment of the present invention. Referring to FIG. 1, the implementation environment may include a control device 101 and a network device 102. A communication connection may be established between the control device 101 and the network device 102 based on a specified routing protocol.

The control device 101 is configured to manage an IP address in an address pool of the network device 102. Specifically, the control device 101 may assign a first IP address set to the address pool when the address pool of the network device 102 is in an address insufficient state, and recycle a second IP address set in the address pool when the address pool of the network device 102 is in an address abundant state. In addition, the control device 101 can not only manage an IP address in an address pool of one network device 102, but also simultaneously manage IP addresses in address pools of a plurality of network devices 102.

The network device 102 is configured to assign an IP address to a client. In this embodiment of the present invention, assigning the IP address by the network device to the client may be directly assigning the IP address to the client, or may be converting an original Internet Protocol version 4 (Internet Protocol Version 4, IPv4) address of the client into an Internet Protocol version 6 (IPv6) address and then assigning the address to the client. This is not specifically limited in this embodiment of the present invention. The address pool may be configured in the network device 102, and a plurality of IP address segments may be stored in the address pool. The network device 102 may update the address pool of the network device 102 based on an IP address set carried in a routing message sent by the control device 101. In addition, the network device 102 may establish connections to a plurality of clients, so as to receive and respond to IP address assignment requests of the plurality of clients, and the network device 102 may further establish a connection to a router, so as to access an IP network by using the router.

Figure 2:
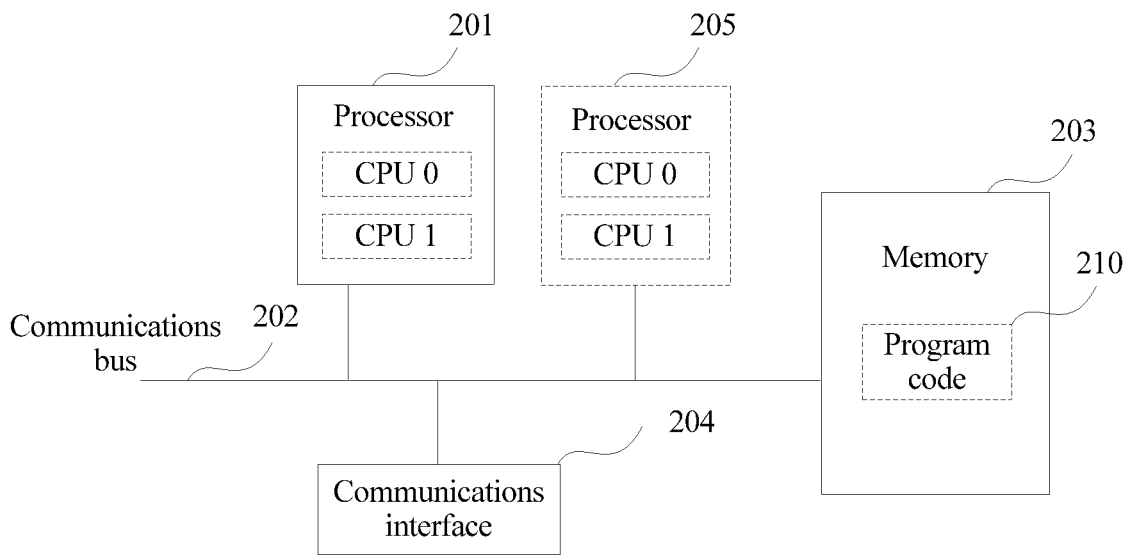
FIG. 2 is a schematic structural diagram of a control device according to an embodiment of the present invention.

FIG. 2 is a schematic structural diagram of a control device according to an embodiment of the present invention. The control device may be the control device 101 shown in FIG. 1. Referring to FIG. 2, the control device 101 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits that are configured to control program execution of the solutions of the present invention.

The communications bus 202 may include a channel used to transfer information between the foregoing components.

The memory 203 may be a read-only memory (ROM) or a static storage device of another type that can store static information and instructions, a random access memory (RAM), or a dynamic storage device of another type that can store information and instructions, or may be an electrically erasable programmable read-only memory (CD-ROM) or other compact disk storage, optical disc storage (including a compact disc, a laser disc, an optical disc, a digital versatile disc, a Blu-ray disc, and the like), a disk storage medium or another disk storage device, or any other medium that can be used to carry or store expected program code in an instruction or data structure form and that can be accessed by the control device 101; however, the memory 203 is not limited thereto. The memory 203 may exist independently, and is connected to the processor 201 by using the communications bus 202. Alternatively, the memory 203 may be integrated with the processor 201.

The communications interface 204 may be any apparatus like a transceiver, and is configured to communicate with another device or communications network, such as an Ethernet network, a radio access network (RAN), or a wireless local area network (WLAN).

During specific implementation, in an embodiment, the processor 201 may include one or more CPUs, such as a CPU 0 and a CPU 1 shown in FIG. 2.

During specific implementation, in an embodiment, the control device 101 may include a plurality of processors, such as a processor 201 and a processor 205 shown in FIG. 2. Each of these processors may be a single-core processor (single-CPU) or a multi-core processor (multi-CPU). The processor herein may be one or more devices, a circuit, and/or a processing core configured to process data.

The memory 203 is configured to store program code 210 for executing the solutions of the present invention, and the processor 201 is configured to execute the program code 210 stored in the memory 203. The control device 101 shown in FIG. 1 may implement, by using the processor 201 and the program code 210 in the memory 203, an address management method provided in an embodiment of FIG. 4A below.

Figure 3:
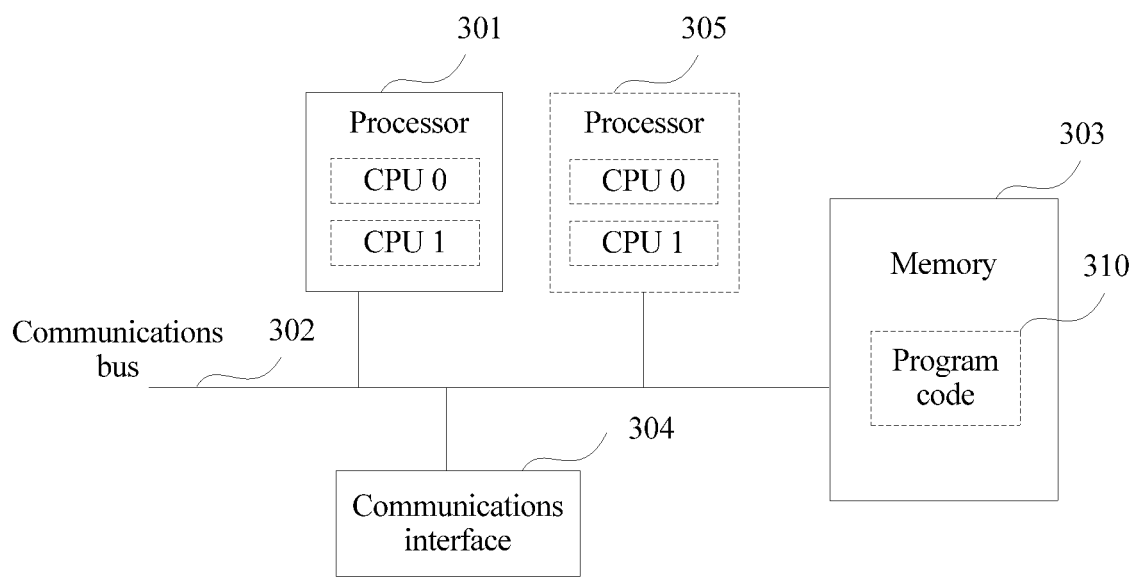
FIG. 3 is a schematic structural diagram of a network device according to an embodiment of the present invention.

FIG. 3 is a schematic structural diagram of a network device according to an embodiment of the present invention. The network device may be the network device 102 shown in FIG. 1. Referring to FIG. 3, the network device 102 includes at least one processor 301, a communications bus 302, a memory 303, and at least one communications interface 304.

The processor 301 may be a general-purpose CPU, a microprocessor, an ASIC, or one or more integrated circuits that are configured to control program execution of the solutions of the present invention.

The communications bus 302 may include a channel used to transfer information between the foregoing components.

The memory 303 may be a ROM or a static storage device of another type that can store static information and instructions, a RAM, or a dynamic storage device of another type that can store information and instructions, or may be an EEPROM, a CD-ROM or other compact disk storage, optical disc storage (including a compact disc, a laser disc, an optical disc, a digital versatile disc, a Blu-ray disc, and the like), a disk storage medium or another disk storage device, or any other medium that can be used to carry or store expected program code in an instruction or data structure form and that can be accessed by the network device 102; however, the memory 303 is not limited thereto. The memory 303 may exist independently, and is connected to the processor 301 by using the communications bus 302. Alternatively, the memory 303 may be integrated with the processor 301.

The communications interface 304 may be any apparatus like a transceiver, and is configured to communicate with another device or communications network, such as an Ethernet network, a RAN, or a WLAN.

During specific implementation, in an embodiment, the processor 301 may include one or more CPUs, such as a CPU 0 and a CPU 1 shown in FIG. 3.

During specific implementation, in an embodiment, the network device 102 may include a plurality of processors, such as a processor 301 and a processor 305 shown in FIG. 3. Each of these processors may be a single-CPU or a multi-CPU. The processor herein may be one or more devices, a circuit, and/or a processing core configured to process data.

The memory 303 is configured to store program code 310 for executing the solutions of the present invention, and the processor 301 is configured to execute the program code 310 stored in the memory 303. The network device 102 shown in FIG. 1 may implement, by using the processor 301 and the program code 310 in the memory 303, an address management method provided in an embodiment of FIG. 4A below.

Figure 4A:
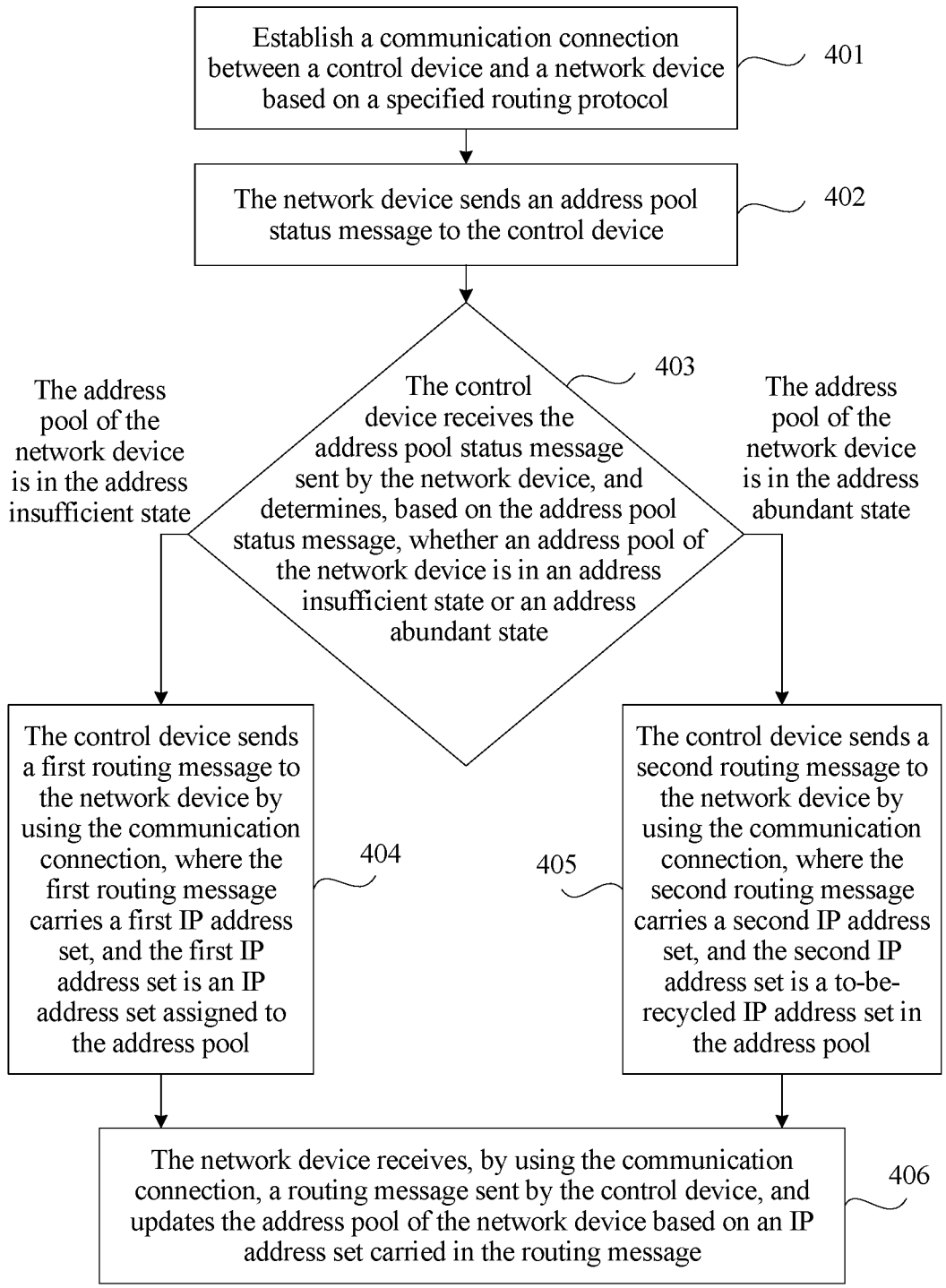
FIG. 4A is a flowchart of an address management method according to an embodiment of the present invention.

FIG. 4A is a flowchart of an address management method according to an embodiment of the present invention. Referring to FIG. 4A, the method includes the following steps.

Step 401: Establish a communication connection between a control device and a network device based on a specified routing protocol.

The specified routing protocol may be preset. For example, the specified routing protocol may be a BGP, open shortest path first (OSPF), or a Routing Information Protocol (RIP). This is not specifically limited in this embodiment of the present invention.

For example, the control device is configured to manage an IP address in an address pool of the network device. For example, the control device may assign an IP address to the address pool of the network device, or may recycle some IP addresses in the address pool of the network device. The control device may be a software defined networking (SDN) controller or the like. This is not specifically limited in this embodiment of the present invention.

For example, the address pool may be configured in the network device. A plurality of IP address segments may be stored in the address pool. The network device may directly assign an IP address to a client, or the network device may convert an original IPv4 address of the client into an IPv6 address and then assign the address to the client. The network device may be a broadband network gateway (BNG), a broadband remote access server (BRAS), a network address translation (NAT) device, an IPv6 transition device, or the like. This is not specifically limited in this embodiment of the present invention.

When the specified routing protocol is the BGP protocol, the establishing a communication connection between a control device and a network device based on a specified routing protocol may include: For the control device, both the control device and the network device run the BGP protocol, the control device sends a first open (open) message to the network device, and the control device sends a first keepalive (keepalive) message to the network device when receiving a second open message sent by the network device. For the network device, the network device sends the second open message to the control device, the network device sends a second keepalive message to the control device when receiving the first open message sent by the control device, and the communication connection between the control device and the network device is established when the control device receives the second keepalive message sent by the network device and the network device receives the first keepalive message sent by the control device. Interaction of the first open message and the second open message is to establish a BGP session between the control device and the network device. Sending the first keepalive message and the second keepalive message is to maintain the BGP session between the control device and the network device.

For example, an operation of establishing the communication connection between the control device and the network device based on the specified routing protocol is similar to an operation of establishing a connection between two devices based on a protocol in related technologies. Details are not described in this embodiment of the present invention.

Further, after the communication connection between the control device and the network device is established, the control device and the network device may further maintain the communication connection by periodically sending a first specified message, so that the control device subsequently can manage the IP address in the address pool of the network device based on the communication connection. The first specified message may be preset. For example, when the specified routing protocol is the BGP protocol, the first specified message may be the first keepalive message or the second keepalive message. This is not specifically limited in this embodiment of the present invention.

For example, in this embodiment of the present invention, the communication connection between the control device and the network device may be established by using step 401. The control device may manage the IP address in the address pool of the network device based on the communication connection. An operation that the control device manages the IP address in the address pool of the network device based on the communication connection may be implemented by using the following steps 402 to 406.

Step 402: The network device sends an address pool status message to the control device.

Specifically, the network device may send the address pool status message to the control device in any one of the following manner 1 to manner 3.

Manner 1: The network device may send the address pool status message to the control device every specified duration. The specified duration may be preset. For example, the specified duration may be one minute or two minutes. This is not specifically limited in this embodiment of the present invention.

Manner 2: The network device sends the address pool status message to the control device when a timing time arrives. The timing time may be preset. For example, the timing time may be 02:30:20, 02:31:30, or 02:31:40. This is not specifically limited in this embodiment of the present invention.

Manner 3: The network device sends the address pool status message to the control device when receiving a control message sent by the control device. The control message is used to instruct the network device to send the address pool status message to the control device. The control message may be a Telnet (Telnet) message or the like. This is not specifically limited in this embodiment of the present invention. When the control message is the Telnet message, a Telnet connection may be pre-established between the control device and the network device, and the network device may receive, by using the Telnet connection, the Telnet message sent by the control device.

The network device may further combine any two or three of the foregoing manners. For example, the network device combines the manner 1 and the manner 3. The network device sends the address pool status message to the control device every specified duration when the network device does not receive the control message sent by the control device. The network device immediately sends the address pool status message to the control device when the network device receives the control message sent by the control device. The network device may combine the foregoing three manners. The network device may send the address pool status message to the control device every specified duration when the network device does not receive the control message sent by the control device. When the network device receives the control message sent by the control device, the network device determines whether the timing time arrives, and the network device sends the address pool status message to the control device when the timing time arrives. The network device continues waiting when the timing time does not arrive, and sends the address pool status message to the control device when the timing time arrives.

The address pool status message may be a first address status message, a second address status message, a first prompt message, or a second prompt message. This is not specifically limited in this embodiment of the present invention. The first address status message includes utilization of each IP address segment in the address pool of the network device. The second address status message includes utilization of the address pool of the network device. The first prompt message includes information that is used to indicate that the address pool of the network device is in an address insufficient state. The second prompt message includes information that is used to indicate that the address pool of the network device is in an address abundant state.

The address insufficient state is a state in which the utilization of each IP address segment in the address pool of the network device is greater than or equal to first specified utilization, and the address abundant state is a state in which the address pool of the network device has an IP address segment whose utilization is less than or equal to second specified utilization. Alternatively, the address insufficient state is a state in which the utilization of the address pool of the network device is greater than or equal to the first specified utilization, and the address abundant state is a state in which the utilization of the address pool of the network device is less than or equal to the second specified utilization.

Both the first specified utilization and the second specified utilization may be preset. For example, the first specified utilization ratio may be 0.8 or 0.9, and the second specified utilization ratio may be 0.2 or 0.3. This is not specifically limited in this embodiment of the present invention.

When the utilization of each IP address segment in the address pool of the network device is greater than or equal to the first specified utilization, it indicates that most IP addresses in each IP address segment in the address pool are occupied, and a quantity of IP addresses in the address pool probably cannot meet an IP address assignment requirement of the client. The address pool is in the address insufficient state. When the address pool of the network device has an IP address segment whose utilization is less than or equal to the second specified utilization, it indicates that a large quantity of IP addresses in some IP address segments in the address pool are not occupied. The address pool has a large quantity of idle IP addresses, and the address pool is in the address abundant state.

In addition, when the utilization of the address pool of the network device is greater than or equal to the first specified utilization, it indicates that most IP addresses in the address pool are occupied, and the quantity of IP addresses in the address pool probably cannot meet the IP address assignment requirement of the client. The address pool is in the address insufficient state. When the utilization of the address pool of the network device is less than or equal to the second specified utilization, it indicates that a large quantity of IP addresses in the address pool are not occupied. The address pool has a large quantity of idle IP addresses, and in this case, the address pool is in the address abundant state.

Further, the network device may further generate the address pool status message before sending the address pool status message to the control device. Specifically, when the address insufficient state is the state in which the utilization of each IP address segment in the address pool is greater than or equal to the first specified utilization, and the address abundant state is the state in which the address pool has an IP address segment whose utilization is less than or equal to the second specified utilization, an operation that the network device generates the address pool status message may include the following first manner or second manner. When the address insufficient state is the state in which the utilization of the address pool is greater than or equal to the first specified utilization, and the address abundant state is the state in which the utilization of the address pool is less than or equal to the second specified utilization, the operation that the network device generates the address pool status message may include the following third manner or fourth manner.

The first manner: The network device obtains the utilization of each IP address segment in the address pool, and the network device generates the first address status message based on the utilization of each IP address segment. The first address status message is the address pool status message.

When the network device obtains the utilization of each IP address segment in the address pool, for each IP address segment in the address pool, the network device may determine a use status of each IP address in the IP address segment. The use status includes an idle state or an occupied state. The network device divides a quantity of occupied IP addresses in the IP address segment by a total quantity of IP addresses in the IP address segment, to obtain the utilization of the IP address segment. Refer to related technologies for an operation that the network device determines the use status of each IP address in the IP address segment. Details are not described in this embodiment of the present invention.

For example, refer to other related technologies for an operation that the network device obtains the utilization of each IP address segment in the address pool. Details are not described in this embodiment of the present invention.

That the network device generates the first address status message based on the utilization of each IP address segment in the address pool includes: The network device may directly generate the first address status message based on the utilization of each IP address segment, where the first address status message carries only the utilization of each IP address segment; or the network device may determine the use status of each IP address in each IP address segment, and generate the first address status message based on the utilization of each IP address segment and the use status of each IP address in each IP address segment, where the first address status message carries the utilization of each IP address segment and the use status of each IP address in each IP address segment.

For example, the network device may obtain the first address status message by extending a second specified message. The second specified message may be preset. For example, the second specified message may be an SNMP trap message or a BGP notification message. This is not specifically limited in this embodiment of the present invention.

Figure 4B:
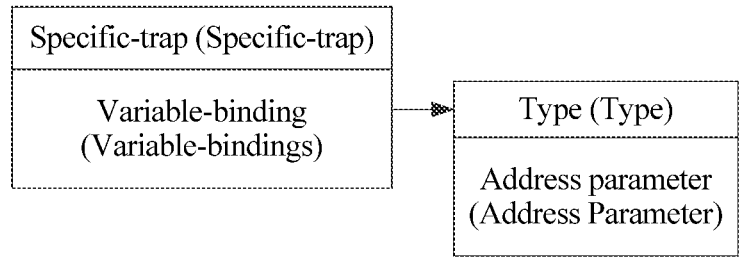
FIG. 4B (a) is a schematic diagram of a format of a Simple Network Management Protocol (SNMP) trap (trap) message according to an embodiment of the present invention.
Figure 4B:
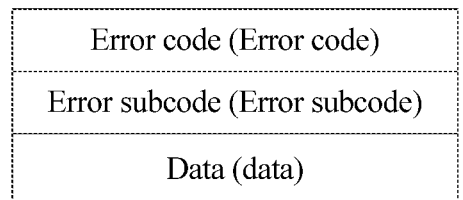

For example, the network device may extend an SNMP trap message having a message format shown in FIG. 4B (a). Specifically, the network device may set a type (Type) subfield in a variable-binding (Variable-binding) field in the SNMP trap message to a first specified value. The network device may add the utilization of each IP address segment or the utilization of each IP address segment and the use status of each IP address in each IP address segment to an address parameter (Address Parameter) subfield in the variable-binding field. The first specified value may be preset, and the first specified value is used to indicate that the SNMP trap message carries the address pool status information.

For example, the network device may extend a BGP notification message having a message format shown in FIG. 4B (b). Specifically, the network device may set an error code (Error code) field or an error subcode (Error subcode) field in the BGP notification message to a second specified value. The network device may add the utilization of each IP address segment or the utilization of each IP address segment and the use status of each IP address in each IP address segment to a data field in the BGP notification message, so as to extend the BGP notification message to the first address status message. The second specified value may be preset, and the second specified value is used to indicate that the BGP notification message carries the address pool status information.

The second manner: The network device obtains the utilization of each IP address segment in the address pool; and obtains the first prompt message if the utilization of each IP address segment in the address pool is greater than or equal to the first specified utilization; or obtains the second prompt message if the address pool has an IP address segment whose utilization is less than or equal to the second specified utilization. The first prompt message or the second prompt message is the address status message.

The operation that the network device obtains the utilization of each IP address segment in the address pool is the same as the obtaining operation in the first manner of step 402. Details are not described again in this embodiment of the present invention.

The second prompt message includes the information that is used to indicate that the address pool is in the address abundant state, and the control device may recycle an idle IP address in the address pool when the address pool is in the address abundant state. Therefore, the network device may first determine an idle IP address set in the address pool after obtaining the second prompt message. The idle IP address set is a to-be-recycled IP address set in the address pool. The network device may generate the second prompt message based on the to-be-recycled IP address set in the address pool. The second prompt message carries the to-be-recycled IP address set in the address pool, so that the control device recycles the to-be-recycled IP address set in the address pool based on the second prompt message.

That the network device determines the idle IP address set in the address pool includes: The network device determines an IP address segment whose utilization ratio is 0 in the address pool as the idle IP address set in the address pool. Alternatively, that the network device determines the idle IP address set in the address pool includes: The network device determines a use status of each IP address in the IP address segment whose utilization is less than or equal to the second specified utilization; the network device obtains, based on the use status of each IP address in the IP address segment whose utilization is less than or equal to the second specified utilization, an idle IP address from the IP address segment whose utilization is less than or equal to the second specified utilization; and the network device determines the idle IP address set in the address pool based on the obtained idle IP address.

When utilization ratio of an IP address segment is 0, it indicates that a use status of each IP address in the IP address segment is idle. Therefore, the IP address segment may be determined as the idle IP address set. In this case, the network device can quickly determine the idle IP address set in the address pool without a need of performing another complex operation, so that determining efficiency is relatively high.

In addition, use statuses of most IP addresses in the IP address segment whose utilization is less than or equal to the second specified utilization are idle. Therefore, the network device may obtain the idle IP address from the IP address segment whose utilization is less than or equal to the second specified utilization, and then determine the idle IP address set in the address pool based on the obtained idle IP address. In this case, the network device can more accurately determine the idle IP address set in the address pool, so that management accuracy is higher and a management effect is better when the control device subsequently manages the IP address in the address pool based on the idle IP address set in the address pool.

When the idle IP address set in the address pool is determined based on the obtained idle IP address, if the idle IP address has a plurality of consecutive IP addresses, the plurality of consecutive IP addresses may be formed into an IP address segment, and the formed IP address segment is determined as the idle IP address set in the address pool. In addition, an operation of determining the idle IP address set in the address pool based on the obtained idle IP address is similar to an operation of determining some IP address sets based on some IP addresses in related technologies. Details are not described in this embodiment of the present invention.

The third manner: The network device obtains the utilization of the address pool, and the network device generates the second address status message based on the utilization of the address pool. The second address status message is the address pool status message.

The network device may determine a use status of each IP address in the address pool when obtaining the utilization of the address pool. The network device divides a quantity of IP addresses whose use statuses are the occupied state in the address pool by a total quantity of IP addresses in the address pool, to obtain the utilization of the address pool. Refer to other related technologies for an operation that the network device determines the use status of each IP address in the address pool. Details are not described in this embodiment of the present invention. Refer to related technologies for an operation that the network device obtains the utilization of the address pool. Details are not described in this embodiment of the present invention.

The network device may directly generate the second address status message based on the utilization of the address pool. The second address status message carries only the utilization of the address pool. Alternatively, the network device may determine the utilization of each IP address segment in the address pool, and generate the second address status message based on the utilization of the address pool and the utilization of each IP address segment in the address pool. The second address status message carries the utilization of the address pool and the utilization of each IP address segment in the address pool. Alternatively, the network device may determine the use status of each IP address in the address pool, and generate the second address status message based on the utilization of the address pool and the use status of each IP address in the address pool. The second address status message carries the utilization of the address pool and the use status of each IP address in the address pool.

For example, the network device may obtain the second address status message by extending the second specified message. For example, the network device may extend the SNMP trap message having the message format shown in FIG. 4B (a). Specifically, the network device may set the type subfield in the variable-binding field in the SNMP trap message to the first specified value. The network device adds the utilization of the address pool, or the utilization of the address pool and the utilization of each IP address segment in the address pool, or the utilization of the address pool and the use status of each IP address in the address pool to the address parameter subfield in the variable-binding field, so as to extend the SNMP trap message to the second address status message.

For another example, the network device may extend the BGP notification message having the message format shown in FIG. 4B (b). Specifically, the network device may set the error code field or the error subcode field in the BGP notification message to the second specified value. The network device adds the utilization of the address pool, or the utilization of the address pool and the utilization of each IP address segment in the address pool, or the utilization of the address pool and the use status of each IP address in the address pool to the data field in the BGP notification message, so as to extend the BGP notification message to the second address status message.

The fourth manner: The network device obtains the utilization of the address pool; and obtains the first prompt message if the utilization of the address pool is greater than or equal to the first specified utilization; or obtains the second prompt message if the utilization of the address pool is less than or equal to the second specified utilization. The first prompt message or the second prompt message is the address status message.

The operation that the network device obtains the utilization of the address pool is the same as the obtaining operation in the third manner of step 402. Details are not described again in this embodiment of the present invention.

The second prompt message includes the information that is used to indicate that the address pool is in the address abundant state, and the control device needs to recycle the idle IP address in the address pool when the address pool is in the address abundant state. Therefore, the network device may first determine the idle IP address set in the address pool after obtaining the second prompt message. The idle IP address set is the to-be-recycled IP address set in the address pool. The network device may generate the second prompt message based on the to-be-recycled IP address set in the address pool. The second prompt message carries the to-be-recycled IP address set in the address pool, so that the control device subsequently recycles the to-be-recycled IP address set in the address pool based on the second prompt message.

An operation that the network device determines the idle IP address set in the address pool may be: The network device obtains the utilization of each IP address segment in the address pool, and determines the IP address segment whose utilization ratio is 0 in the address pool as the idle IP address set in the address pool. Alternatively, the network device determines the use status of each IP address in the address pool; the network device obtains the idle IP address from the address pool based on the use status of each IP address in the address pool; and the network device determines the idle IP address set in the address pool based on the obtained idle IP address.

For example, the operation that the network device determines the idle IP address set in the address pool is similar to the determining operation in the second manner of step 402. Details are not described again in this embodiment of the present invention.

Step 403: The control device receives the address pool status message sent by the network device, and determines, based on the address pool status message, whether an address pool of the network device is in an address insufficient state or an address abundant state.

When the address pool status message is the first address status message, the address insufficient state is the state in which the utilization of each IP address segment in the address pool is greater than or equal to the first specified utilization, and the address abundant state is the state in which the address pool has an IP address segment whose utilization is less than or equal to the second specified utilization, an operation that the control device determines, based on the address pool status message, whether the address pool of the network device is in the address pool insufficient state or the address abundant state may include the following first manner. When the address pool status message is the second address status message, the address insufficient state is the state in which the utilization of the address pool is greater than or equal to the first specified utilization, and the address abundant state is the state in which the utilization of the address pool is less than or equal to the second specified utilization, the operation that the control device determines, based on the address pool status message, whether the address pool of the network device is in the address pool insufficient state or the address abundant state may include the following second manner. When the address pool status message is the first prompt message or the second prompt message, the operation that the control device determines, based on the address pool status message, whether the address pool of the network device is in the address pool insufficient state or the address abundant state may include the following third manner.

The first manner: The control device obtains the utilization that is of each IP address segment in the address pool and that is carried in the first address status message; and if the utilization of each IP address segment is greater than or equal to the first specified utilization, determines that the address pool is in the address insufficient state; or if the address pool has an IP address segment whose utilization is less than or equal to the second specified utilization, determines that the address pool is in the address abundant state.

When the address pool is in the address abundant state, the control device subsequently needs to recycle the idle IP address set in the address pool. The idle IP address set is the to-be-recycled IP address set in the address pool. Therefore, further, the control device may determine the idle IP address set in the address pool after determining that the address pool is in the address abundant state, and an operation that the control device determines the idle IP address set in the address pool may be: determining the IP address segment whose utilization ratio is 0 in the address pool as the idle IP address set in the address pool; or when the first address status message carries the use status of each IP address in each IP address segment, obtaining, based on the use status of each IP address in the IP address segment whose utilization is less than or equal to the second specified utilization, the idle IP address from the IP address segment whose utilization is less than or equal to the second specified utilization, and determining the idle IP address set in the address pool based on the obtained idle IP address.

When directly determining the IP address segment whose utilization ratio is 0 in the address pool as the idle IP address set in the address pool, the control device can quickly determine the idle IP address set in the address pool without a need of performing another complex operation, so that determining efficiency is relatively high. The first address status message may carry only the utilization of each IP address segment, so as to decrease data transmission between the network device and the control device, and reduce a transmission time of the first address status message.

In addition, when determining the idle IP address set in the address pool based on the obtained idle IP address, the control device can more accurately determine the idle IP address set in the address pool, so that management accuracy is higher and a management effect is better when the control device subsequently manages the IP address in the address pool based on the idle IP address set in the address pool.

The second manner: The control device obtains the utilization that is of the address pool and that is carried in the second address status message; and if the utilization of the address pool is greater than or equal to the first specified utilization, determines that the address pool is in the address insufficient state; or if the utilization of the address pool is less than or equal to the second specified utilization, determines that the address pool is in the address abundant state.

The control device subsequently needs to recycle the idle IP address set in the address pool when the address pool is in the address abundant state. The idle IP address set is the to-be-recycled IP address set in the address pool. Further, the control device may further determine the idle IP address set in the address pool after determining that the address pool is in the address abundant state, and the operation that the control device determines the idle IP address set in the address pool may be: determining the IP address segment whose utilization ratio is 0 in the address pool as the idle IP address set in the address pool when the second address status message carries the utilization of each IP address segment in the address pool; or obtaining the idle IP address from the address pool based on the use status of each IP address in the address pool when the second address status message carries the use status of each IP address in the address pool, and determining the idle IP address set in the address pool based on the obtained idle IP address.

When directly determining the IP address segment whose utilization ratio is 0 in the address pool as the idle IP address set in the address pool, the control device can quickly determine the idle IP address set in the address pool without a need of performing another complex operation, so that determining efficiency is relatively high. The second address status message may carry only the utilization of the address pool and the utilization of each IP address segment in the address pool, so as to decrease data transmission between the network device and the control device, and reduce a transmission time of the second address status message.

In addition, when determining the idle IP address set in the address pool based on the obtained idle IP address, the control device can more accurately determine the idle IP address set in the address pool, so that management accuracy is higher and a management effect is better when the control device subsequently manages the IP address in the address pool based on the idle IP address set in the address pool.

The third manner: If the address pool status message is the first prompt message, the control device determines that the address pool is in the address insufficient state; or if the address pool status message is the second prompt message, the control device determines that the address pool is in the address abundant state.

For example, in this embodiment of the present invention, the control device may determine whether the address pool of the network device is in the address insufficient state or the address abundant state by using step 403. When the address pool of the network device is in the address insufficient state, the control device may manage the IP address in the address pool of the network device by using the following step 404. When the address pool of the network device is in the address abundant state, the control device may manage the IP address in the address pool of the network device by using the following step 405.

Step 404: The control device sends a first routing message to the network device by using the communication connection if the address pool of the network device is in the address insufficient state. The first routing message carries a first IP address set, and the first IP address set is an IP address set assigned to the address pool.

For example, the first routing message is used to instruct to assign the first IP address set to the address pool of the network device. The first IP address set is an IP address set not stored in the address pool of the network device before the network device receives the first routing message.

The control device may obtain the first routing message by extending a third specified message. The third specified message may be preset. For example, the third specified message may be a BGP update message that carries an MP_REACH_NLRI attribute.

Figure 4C:
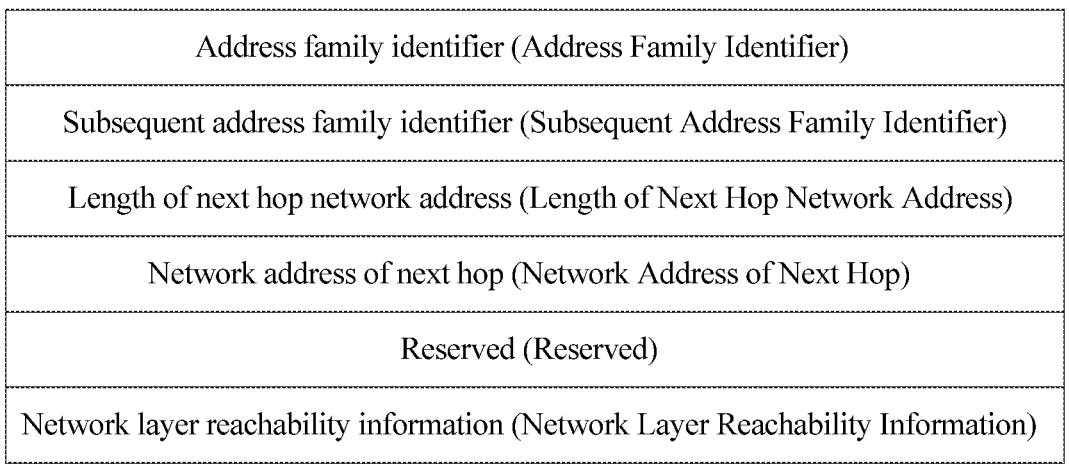
FIG. 4C is a schematic diagram of a format of a BGP update (Update) message according to an embodiment of the present invention.

For example, the control device may extend a BGP update message having a message format shown in FIG. 4C. Specifically, the control device may set a subsequent address family identifier field in the BGP update message to a third specified value. The control device adds the first IP address set to a network layer reachability information (Network Layer Reachability Information) field in the BGP update message, so as to extend the BGP update message to the first routing message. The third specified value may be preset, and the third specified value is used to indicate that the BGP update message carries address information.

Further, the control device may generate the first IP address set before sending the first routing message to the network device by using the communication connection. When generating the first IP address set, the control device may determine, as the first IP address set, the IP address set not stored in the address pool of the network device.

Step 405: The control device sends a second routing message to the network device by using the communication connection if the address pool of the network device is in the address abundant state. The second routing message carries a second IP address set, and the second IP address set is a to-be-recycled IP address set in the address pool.

For example, the second routing message is used to instruct to recycle the second IP address set in the address pool of the network device. The second IP address set is the idle IP address set in the address pool. After recycling the second IP address set, the control device may assign the second IP address set to another network device that needs an IP address, so as to improve IP address utilization.

In addition, the control device may obtain the second routing message by extending a fourth specified message. The fourth specified message may be preset. For example, the fourth specified message may be a BGP update message that carries an MP_UNREACH_NLRI attribute.

Figure 4D:
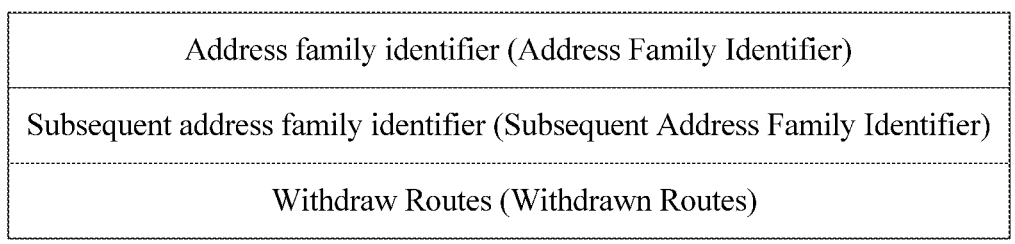
FIG. 4D is a schematic diagram of a format of another BGP update message according to an embodiment of the present invention.

For example, the control device may extend a BGP update message having a message format shown in FIG. 4D. Specifically, the control device may set a subsequent address family identifier field in the BGP update message to a fourth specified value. The control device adds the second IP address set to a withdrawn routes (Withdrawn Routes) field in the BGP update message, so as to extend the BGP update message to the second routing message. The fourth specified value may be preset, and the fourth specified value is used to indicate that the BGP update message carries address information.

Further, the control device may generate the second IP address set before sending the second routing message to the network device by using the communication connection. When generating the second IP address set, the control device may determine, as the second IP address set, the idle IP address set that is in the address pool and that is determined in step 403.

Step 406: The network device receives, by using the communication connection, a routing message sent by the control device, and updates the address pool of the network device based on an IP address set carried in the routing message.

For example, the routing message may be the first routing message or the second routing message. When the routing message is the first routing message, the IP address set carried in the routing message is the first IP address set. When the routing message is the second routing message, the IP address set carried in the routing message is the second IP address set.

When updating the address pool of the network device based on the IP address set carried in the routing message, the network device adds the first IP address set to the address pool of the network device if the routing message is the first routing message, or the network device releases the second IP address set in the address pool of the network device if the routing message is the second routing message.

In this embodiment of the present invention, the specified routing protocol is generally an inherent protocol in the network device. Therefore, according to the address management method provided in this embodiment of the present invention, only one control device needs to be added, and then the control device and the network device are connected by using the specified routing protocol, so as to manage the IP address in the address pool of the network device. According to the address management method, an original network structure is slightly modified, so that address management costs are reduced. Through interaction between the network device and the control device, an address resource in the address pool of the network device is maintained, and the IP address is dynamically assigned and recycled as required, thereby improving address management accuracy.

Figure 5A:
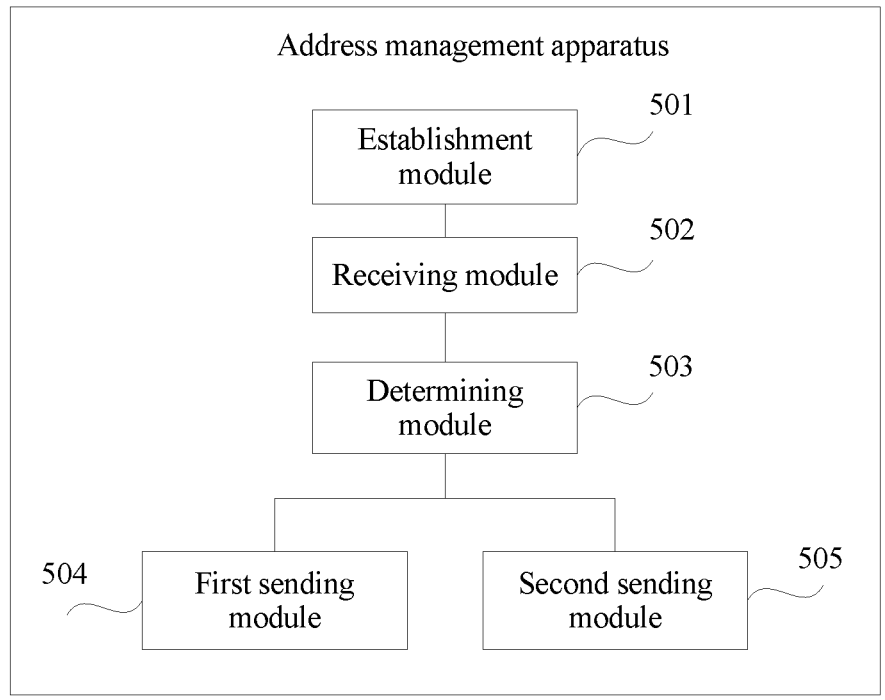
FIG. 5A is a schematic structural diagram of a first address management apparatus according to an embodiment of the present invention.

FIG. 5A is a schematic structural diagram of an address management apparatus according to an example embodiment. The address management apparatus may be implemented as a part or all of a control device by using software, hardware, or a combination of software and hardware. The control device may be the control device shown in FIG. 2. The address management apparatus may include an establishment module 501, a receiving module 502, a determining module 503, a first sending module 504, and a second sending module 505.

The establishment module 501 is configured to perform step 401 in the embodiment of FIG. 4A. The receiving module 502 and the determining module 503 are configured to perform step 403 in the embodiment of FIG. 4A. The first sending module 504 is configured to perform step 404 in the embodiment of FIG. 4A. The second sending module 505 is configured to perform step 405 in the embodiment of FIG. 4A.

Figure 5B:
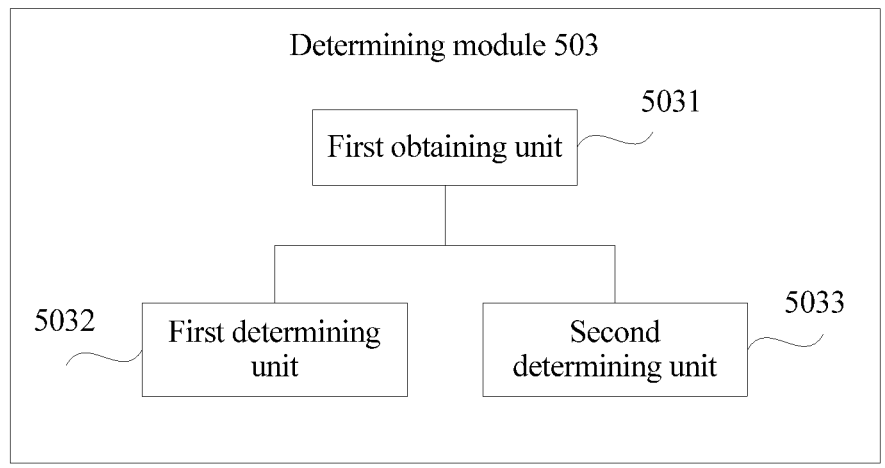
FIG. 5B is a schematic structural diagram of a first determining module according to an embodiment of the present invention.

Optionally, referring to FIG. 5B, the determining module 503 includes a first obtaining unit 5031, a first determining unit 5032, and a second determining unit 5033.

The first obtaining unit 5031, the first determining unit 5032, and the second determining unit 5033 are configured to execute the first manner of step 403 in the embodiment of FIG. 4A.

Figure 5C:
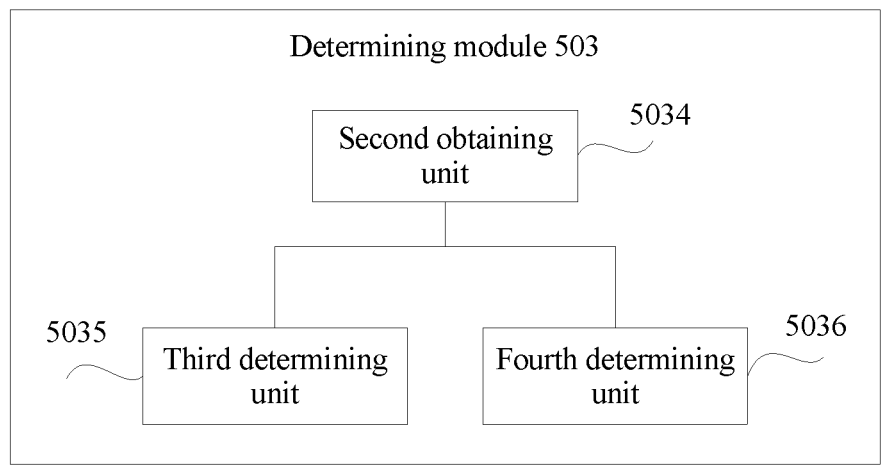
FIG. 5C is a schematic structural diagram of a second determining module according to an embodiment of the present invention.

Optionally, referring to FIG. 5C, the determining module 503 includes a second obtaining unit 5034, a third determining unit 5035, and a fourth determining unit 5036.

The second obtaining unit 5034, the third determining unit 5035, and the fourth determining unit 5036 are configured to execute the second manner of step 403 in the embodiment of FIG. 4A.

Figure 5D:
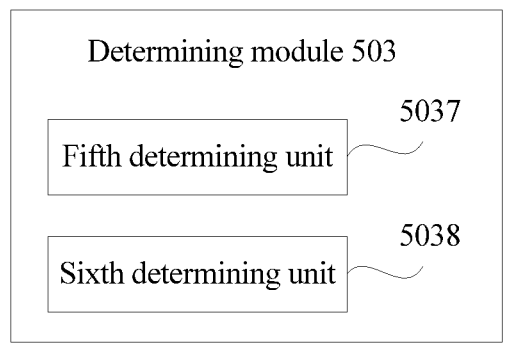
FIG. 5D is a schematic structural diagram of a third determining module according to an embodiment of the present invention.

Optionally, referring to FIG. 5D, the determining module 503 includes a fifth determining unit 5037 and a sixth determining unit 5038.

The fifth determining unit 5037 and the sixth determining unit 5038 are configured to execute the third manner of step 403 in the embodiment of FIG. 4A.

Figure 6A:
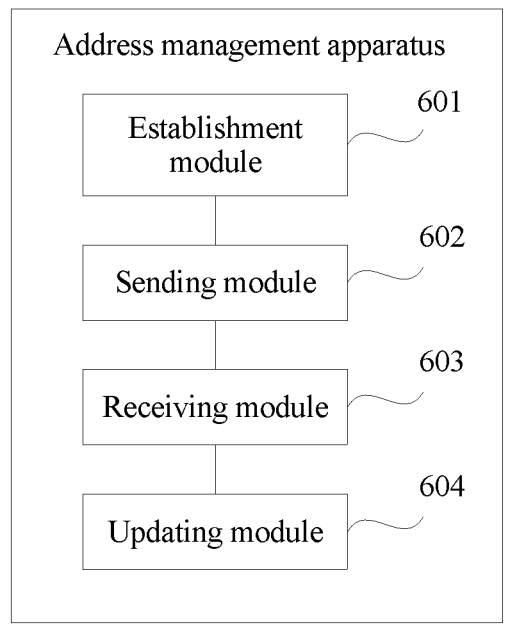
FIG. 6A is a schematic structural diagram of a second address management apparatus according to an embodiment of the present invention.

FIG. 6A is a schematic structural diagram of an address management apparatus according to an example embodiment. The address management apparatus may be implemented as a part or all of the network device by using software, hardware, or a combination of software and hardware. The network device may be the network device shown in FIG. 3. The address management apparatus may include an establishment module 601, a sending module 602, a receiving module 603, and an updating module 604.

The establishment module 601 is configured to perform step 401 in the embodiment of FIG. 4A. The sending module 602 is configured to perform step 402 in the embodiment of FIG. 4A. The receiving module 603 and the updating module 604 are configured to perform step 406 in the embodiment of FIG. 4A.

Figure 6B:
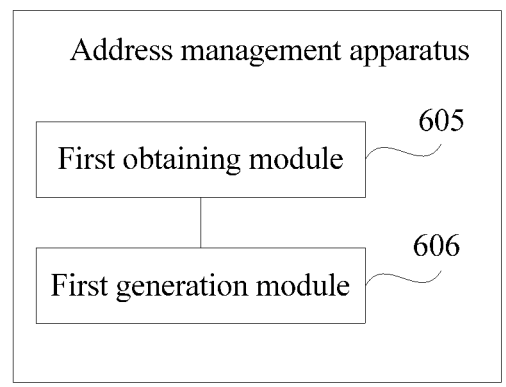
FIG. 6B is a schematic structural diagram of a third address management apparatus according to an embodiment of the present invention.

Optionally, referring to FIG. 6B, the apparatus further includes a first obtaining module 605 and a first generation module 606.

The first obtaining module 605 and the first generation module 606 are configured to execute the first manner of step 402 in the embodiment of FIG. 4A.

Figure 6C:
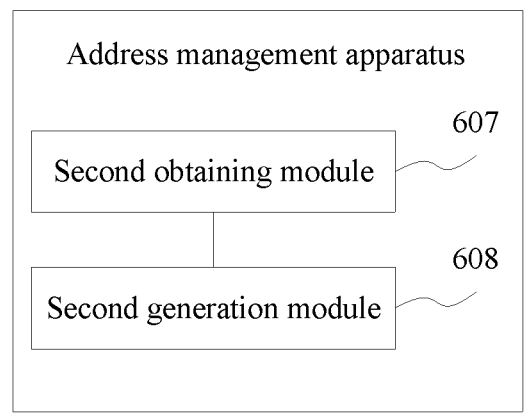
FIG. 6C is a schematic structural diagram of a fourth address management apparatus according to an embodiment of the present invention.

Optionally, referring to FIG. 6C, the apparatus further includes a second obtaining module 607 and a second generation module 608.

The second obtaining module 607 and the second generation module 608 are configured to execute the third manner of step 402 in the embodiment of FIG. 4A.

Figure 6D:
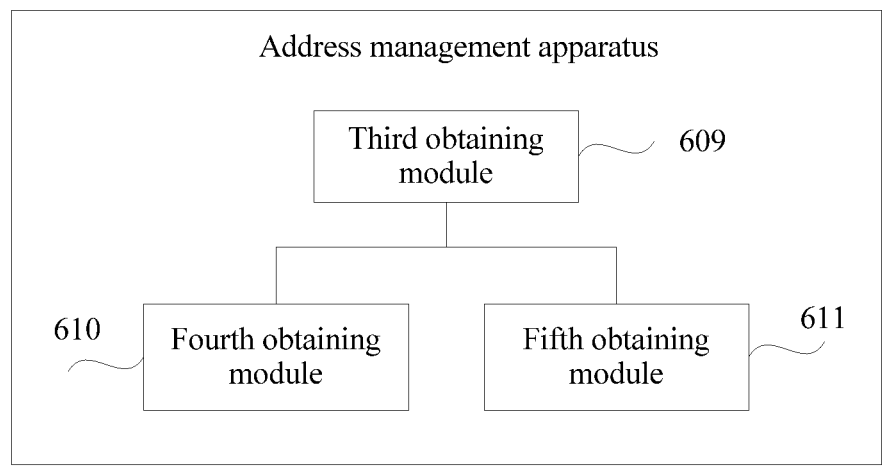
FIG. 6D is a schematic structural diagram of a fifth address management apparatus according to an embodiment of the present invention.

Optionally, referring to FIG. 6D, the apparatus further includes a third obtaining module 609, a fourth obtaining module 610, and a fifth obtaining module 611.

The third obtaining module 609, the fourth obtaining module 610, and the fifth obtaining module 611 are configured to execute the second manner of step 402 in the embodiment of FIG. 4A.

Figure 6E:
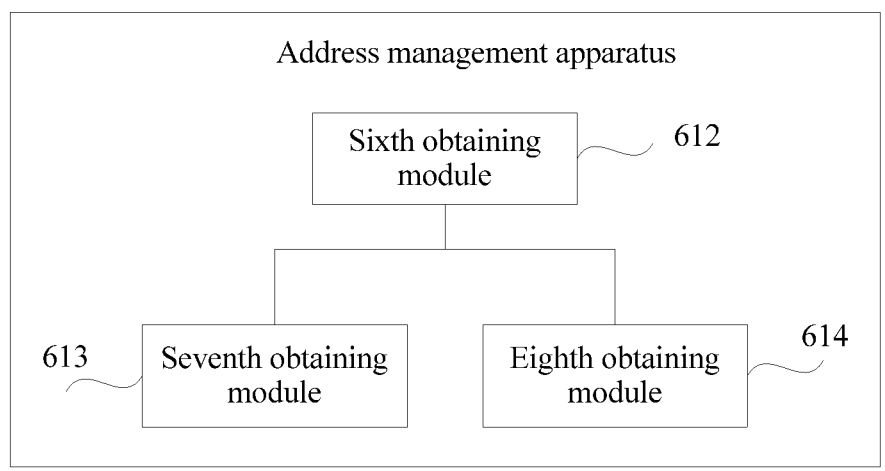
FIG. 6E is a schematic structural diagram of a sixth address management apparatus according to an embodiment of the present invention.

Optionally, referring to FIG. 6E, the apparatus further includes a sixth obtaining module 612, a seventh obtaining module 613, and an eighth obtaining module 614.

The sixth obtaining module 612, the seventh obtaining module 613, and the eighth obtaining module 614 are configured to execute the fourth manner of step 402 in the embodiment of FIG. 4A.

Optionally, a routing message is a first routing message, an IP address set is a first IP address set, the first IP address set is an IP address set assigned to an address pool, and the updating module 604 includes: an adding unit, configured to add the first IP address set to the address pool.

Alternatively, the routing message is a second routing message, the IP address set is a second IP address set, the second IP address set is a to-be-recycled IP address set in the address pool, and the updating module 604 includes: a release unit, configured to release the second IP address set in the address pool.

In this embodiment of the present invention, the network device establishes a communication connection to a control device based on a specified routing protocol. Then, the network device sends an address pool status message to the control device. When receiving, by using the communication connection, the routing message sent by the control device, the network device updates the address pool of the network device based on the IP address set carried in the routing message, so that the control device can automatically manage an IP address in the address pool of the network device, and a job burden on a technical person is reduced.

For example, when the address management apparatus provided in the foregoing embodiment manages an address, division of the foregoing functional modules is used only as an example for description. In actual application, the foregoing functions may be allocated to and implemented by different functional modules according to a requirement, that is, an internal structure of the apparatus is divided into different functional modules for implementing all or some of the functions described above. In addition, the address management apparatus provided in the foregoing embodiment pertains to a same concept as the address management method embodiment. For a specific implementation process of the address management apparatus, refer to the method embodiment. Details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the present invention shall fall within the protection scope of the present invention.

What is claimed is:

1. An address management apparatus, comprising:
a non-transitory memory storage comprising instructions; and
a processor in communication with the non-transitory memory storage, wherein the processor executes the instructions to:
establish a communication connection to a network device based on a routing protocol;
receive, from the network device, a first address pool status message comprising first utilization information of each Internet Protocol (IP) address segment in an address pool of the network device;
determine, based on the first utilization information of the first address pool status message, that the address pool of the network device is in an address insufficient state, wherein the address insufficient state indicates that the utilization of each IP address segment in the address pool is greater than or equal to a first utilization;
send, to the network device, a first routing message using the communication connection according to the first address pool status message, wherein the first routing message carries a first IP address set, and wherein the first IP address set is assigned to the address pool;
receive, from the network device, a second address pool status message comprising second utilization information of each IP address segment in the address pool of the network device;
determine, based on the second utilization information of the second address pool status message, that the network device is in an address abundant state, wherein the address abundant state indicates that the address pool has an IP address segment whose utilization is less than or equal to a second utilization; and send, to the network device, a second routing message using the communication connection, wherein the second routing message carries a second IP address set, and wherein the second IP address set is a to-be-recycled IP address set in the address pool.

2. The address management apparatus according to claim 1, wherein the processor executes further instructions to:
receive, from the network device, a third address status message, wherein the third address status message carries utilization of the address pool;
obtain the utilization of the address pool carried in the third address status message; and
determine that the address pool is in the address insufficient state, wherein the address insufficient state indicates that the utilization of the address pool is greater than or equal to a third utilization.

3. The address management apparatus according to claim 1, wherein the processor executes further instructions to:
receive, from the network device, a third address status message, wherein the third address status message carries utilization of the address pool;
obtain the utilization of the address pool carried in the third address status message; and
determine that the address pool is in the address abundant state, wherein the address abundant state indicates that the utilization of the address pool is less than or equal to a third utilization.

4. The address management apparatus according to claim 1, the processor executes further instructions to:
determine that the address pool is in the address insufficient state, wherein the first address pool status message is a first prompt message indicating that the address pool is in the address insufficient state.

5. The address management apparatus according to claim 1, the processor executes further instructions to:
determine that the address pool is in the address abundant state, wherein the second address pool status message is a second prompt message indicating that the address pool is in the address abundant state.

6. An address management apparatus, comprising:
a non-transitory memory storage comprising instructions; and
a processor in communication with the non-transitory memory storage, wherein the processor executes the instructions to:
establish a communication connection to a control device based on a routing protocol;
obtain first utilization information of each Internet Protocol (IP) address segment in an address pool of the address management apparatus, wherein the first utilization information indicates that the address pool is in an address insufficient state, and wherein the address insufficient state indicates that the utilization of each IP address segment in the address pool is greater than or equal to a first utilization;
generate a first address pool status message based on the first utilization information of each IP address segment in the address pool;
send, to the control device, the first address pool status message comprising the first utilization information of each IP address segment in the address pool;
receive, from the control device, a first routing message using the communication connection, wherein the first routing message carries a first IP address set, wherein the first IP address set is assigned to the address pool; and
update the address pool of the address management apparatus based on the first IP address set carried in the first routing message;
obtain second utilization information of each IP address segment in the address pool, wherein the second utilization information indicates that the address pool is in an address abundant state, and wherein the address abundant state indicates that the address pool has an IP address segment whose utilization is less than or equal to a second utilization;
send, to the control device, a second address pool status message comprising the second utilization information of each IP address segment in the address pool;
receive, from the control device, a second routing message using the communication connection, wherein the second routing message carries a second IP address set, wherein the second IP address set is a to-be-recycled IP address set in the address pool; and
update the address pool of the address management apparatus based on the second IP address set carried in the second routing message.

7. The address management apparatus according to claim 6, wherein:
the address insufficient state indicates that utilization of the address pool is greater than or equal to a third utilization;
the address abundant state indicates that the utilization of the address pool is less than or equal to a fourth utilization; and
the processor executes further instructions to:
obtain the utilization of the address pool; and
generate a third address status message based on the utilization of the address pool.

8. The address management apparatus according to claim 6, wherein the processor executes further instructions to:
obtain utilization of each IP address segment in the address pool; and
obtain the address pool status message, wherein the address pool status message is a first prompt message, the first prompt message indicates that the address pool is in an address insufficient state, and the address insufficient state indicates that the utilization of each IP address segment in the address pool is greater than or equal to a first utilization.

9. The address management apparatus according to claim 6, wherein the processor executes further instructions to:
obtain utilization of each IP address segment in the address pool; and
obtain the address pool status message, wherein the address pool status message is a second prompt message, the second prompt message indicates that the address pool is in an address abundant state, and the address abundant state indicates that the address pool has an IP address segment whose utilization is less than or equal to a second utilization.

10. The address management apparatus according to claim 6, wherein the processor executes further instructions to:
obtain utilization of the address pool; and
obtain the address pool status message, wherein the address pool status message is a first prompt message, the first prompt message indicates that the address pool is in an address insufficient state, and the address insufficient state indicates that the utilization of the address pool is greater than or equal to a first utilization.

11. The address management apparatus according to claim 6, wherein the processor executes further instructions to:
  obtain utilization of the address pool; and
  obtain the address pool status message, wherein the address pool status message is a second prompt message, the second prompt message indicates that the address pool is in an address abundant state, and the address abundant state indicates that the utilization of the address pool is less than or equal to a second utilization.

12. The address management apparatus according to claim 6, wherein:
  the routing message is a first routing message;
  the IP address set is a first IP address set assigned to the address pool; and
  the processor executes further instructions to add the first IP address set to the address pool.

13. The address management apparatus according to claim 6, wherein:
  the routing message is a second routing message;
  the IP address set is a second IP address set;
  the second IP address set is a to-be-recycled IP address set in the address pool; and
  the processor executes further instructions to release the second IP address set in the address pool.

14. The address management apparatus according to claim 7, wherein:
  the routing message is a first routing message;
  the IP address set is a first IP address set;
  the first IP address set is assigned to the address pool; and
  the processor executes further instructions to add the first IP address set to the address pool.

15. The address management apparatus according to claim 7, wherein:
  the routing message is a second routing message;
  the IP address set is a second IP address set;
  the second IP address set is a to-be-recycled IP address set in the address pool; and
  the processor executes further instructions to release the second IP address set in the address pool.

* * * * *